UNITED STATES PATENT OFFICE.

HENRY KNOTH, OF BIRMINGHAM, ALABAMA.

PROCESS OF MANUFACTURING STEEL.

SPECIFICATION forming part of Letters Patent No. 712,389, dated October 28, 1902.

Application filed July 16, 1902. Serial No. 115,852. (No specimens.)

*To all whom it may concern:*

Be it known that I, HENRY KNOTH, a citizen of the United States, residing at Birmingham, Jefferson county, Alabama, have invented certain new and useful Improvements in Processes of Manufacturing Steel, of which the following is a specification.

This invention consists in an improved continuous process for manufacturing steel in open-hearth furnaces, having for its object to dispense with the use of scrap metal, which under the previous open-hearth processes was charged in large percentages with the pig metal, and also to further facilitate and cheapen the manufacture of open-hearth steel.

By my process the impurities of the unpurified metal are diluted by mixture with molten refined metal to a point commensurate with the ordinary mixture of pig metal and scrap, after which the further refinement to any desired degree is effected, as usual, in the furnace.

Broadly, my process consists in reserving a predetermined amount of molten refined metal in some receptacle outside of the furnace in which the heat was made and in charging this reserve back into the furnace after it has been cleared and repaired or into any other furnace then ready to be charged, together with the unpurified metal, whether in a molten state or otherwise. By "unpurified metal" I refer to such metal as would run from a blast-furnace, cupola, or other source in a condition requiring further treatment for conversion into steel of the grade to be produced by this process.

In operation when the heat in any style of open-hearth furnace is ready to be tapped I provide a ladle or other receptacle of suitable description to receive the refined metal and convey it to the molds or elsewhere. A predetermined amount of the molten refined metal is reserved in the ladle and after the furnace has been repaired and is ready for another charge is poured back into the furnace in any convenient manner to act as a substitute for steel-scrap in diluting the impurities of the unpurified metal which is introduced therewith to complete the charge. I prefer to reserve the molten refined metal in the ladle as the most convenient and practical method of operating my invention; but since the reserving of the metal outside of the furnace in which it was refined is the gist of my invention it is evidently immaterial in what kind of vessel or receptacle or by what means this reserve is effected or how it is introduced into the furnace. This reserve of refined metal may be returned to the furnace and charged therein either before or after the unpurified metal has been introduced, or, as is preferable, the two metals in a molten state may be mixed before charging them into the furnace. In this latter process, which I term the "mixing process," the mixed charge as a whole goes into the furnace a mass of molten partially-refined metal in which the impurities of the unpurified metal have been diluted by the molten refined metal that has been mixed therewith. The unpurified metal when used in a molten state may be heated in a blast, cupola, or auxiliary heating-furnace, from which it can be run to the furnace direct when the refined and unrefined metals are to be charged separately, or from which it can be run into the ladle or other receptacle containing the reserve of molten refined metal when they are to be charged together.

I prefer to mix in the ladle, and find that this is most conveniently effected by arranging the heating-furnace for the molten unpurified metal opposite or near the molds. The ladle into which the entire contents of the furnace has been tapped is moved to the the molds and the desired amount of steel poured therein. As the next step, the ladle, now containing only the reserve of molten refined metal, is moved to the heating-furnace, from which a sufficient amount of molten unpurified metal is poured therein to complete the succeeding charge for the furnace, after which it is run back to the furnace, and its contents, now thoroughly mixed, is charged therein in any convenient manner.

As the improvement in this latter process consists in combining the two molten metals of different degrees of refinement outside of the furnace and then charging the resultant partially-purified mass into the furnace, it is immaterial in what other or different ways this mixing and charging may be effected.

The reserving of the molten refined metal from the previous heat makes this a continuous process; but since the reserve is outside of the furnace the bottom may be inspected and repaired between heats, thus obviating the most serious defects in previous continuous processes.

Though I have referred to the reserve as being introduced back into the furnace from which it was poured, it is obvious that when a number of furnaces are in use the reserve from one may be charged into some other furnace then ready to receive it, and in this manner the continuity of the process is the better preserved.

Having thus described my invention, what I claim as new, and desire to secure by Letters Patent, is—

1. The improvement in the continuous process herein described for manufacturing steel by the open-hearth process, consisting in reserving a predetermined amount of molten refined metal from a previous heat outside of the furnace in which it was refined, and introducing this reserve and the necessary amount of unpurified metal to complete the succeeding charge, into the furnace, substantially as described.

2. The improvement in the continuous process herein described for manufacturing steel by the open-hearth process, consisting in emptying a furnace after the initial heat is ready to be tapped, reserving a portion of the refined metal in a ladle or other receptacle, and introducing this reserve with unpurified metal to complete a succeeding charge into a furnace, substantially as described.

3. The improvement in the continuous process herein described for manufacturing steel by the open-hearth process, consisting in reserving, in a ladle or other receptacle, a predetermined percentage of the molten refined metal tapped from one of a number of furnaces, and introducing this reserve with unpurified metal constituting a charge, into any one of the number of furnaces then ready to be charged, substantially as described.

4. The continuous process herein described for manufacturing steel in open-hearth furnaces, consisting in reserving molten refined metal outside of the furnace in which it was refined, and mixing this reserve with molten unpurified metal before charging the resultant partially-purified metal into a furnace as a charge, substantially as described.

5. The continuous process herein described for manufacturing steel in open-hearth furnaces, consisting in mixing in a ladle or other receptacle, and without the furnace in which it was refined, molten refined metal from a previous heat with molten unpurified metal, and introducing the resultant partially-purified metal into a furnace, substantially as described.

6. The process herein described for manufacturing steel in open-hearth furnaces, consisting in reserving a predetermined amount of molten refined metal from a previous heat in a ladle or other receptacle, and introducing upon it molten unpurified metal, thereby diluting the impurities of the unpurified metal, and charging the resultant partially-purified metal into a furnace, substantially as described.

In testimony whereof I have hereunto set my hand in presence of two subscribing witnesses.

HENRY KNOTH.

Witnesses:
J. M. ARROWOOD,
R. D. JOHNSTON.